(12) United States Patent
Eddin et al.

(10) Patent No.: US 12,505,446 B2
(45) Date of Patent: Dec. 23, 2025

(54) TRIAGING ALERTS USING MACHINE LEARNING (71) Applicant: Feedzai—Consultadoria e Inovação Tecnológica, S.A., Coimbra (PT)

(72) Inventors: Ahmad Naser Eddin, Oporto (PT); Jacopo Bono, Esposende (PT); João Tiago Barriga Negra Ascensão, Lisbon (PT); Pedro Gustavo Santos Rodrigues Bizarro, Lisbon (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 131 days.

(21) Appl. No.: 17/831,199

(22) Filed: Jun. 2, 2022

(65) Prior Publication Data
US 2023/0147934 A1   May 11, 2023

Related U.S. Application Data (60) Provisional application No. 63/278,196, filed on Nov. 11, 2021.

(51) Int. Cl.
G06Q 20/40 (2012.01)
G06Q 20/38 (2012.01)
H04L 9/40 (2022.01)

(52) U.S. Cl.
CPC ....... G06Q 20/4016 (2013.01); G06Q 20/382 (2013.01); H04L 63/1416 (2013.01)

(58) Field of Classification Search
None
See application file for complete search history.

(56) References Cited

U.S. PATENT DOCUMENTS 10,515,366 B1   12/2019   Gorelik
10,740,399 B1   8/2020   Eksombatchai
(Continued)

OTHER PUBLICATIONS

Camino et al., Finding Suspicious Activities in Financial Transactions and Distributed Ledgers, IEEE International Conference on Data Mining Workshop, pp. 787-796, 2011.
(Continued)

*Primary Examiner* — Eduardo Castilho
*Assistant Examiner* — Karlyannie M. Garcia
(74) *Attorney, Agent, or Firm* — Van Pelt, Yi & James LLP (57) ABSTRACT In various embodiment, a process for triaging alerts using machine learning includes receiving data associated with transactions and using computer processor(s) to analyze the received data using rule(s) to automatically identify potentially suspicious activities. The process includes scoring each of the identified potentially suspicious activities using a machine learning model and based at least in part on analysis results of the rule(s) associated with the identified potentially suspicious activities, and triaging the identified potentially suspicious activities including by determining an action to take with respect to at least a portion of the identified potentially suspicious activities based at least in part on the scoring. In various embodiments, a process for training a machine learning model to triage alerts includes configuring the machine learning model, and receiving training data. The process includes using computer processor(s) and the received training data to train the machine learning model to score potentially suspicious activities.

12 Claims, 8 Drawing Sheets

(56) References Cited

U.S. PATENT DOCUMENTS

| | | |
|---|---|---|
| 10,778,706 B1 | 9/2020 | Lee |
| 11,263,703 B2 | 3/2022 | Juban |
| 11,328,301 B2 | 5/2022 | Butvinik |
| 11,593,622 B1 | 2/2023 | Gandhi |
| 11,640,609 B1 | 5/2023 | Shoumaker |
| 11,704,673 B1 | 7/2023 | Drapeau |
| 2012/0059858 A1 | 3/2012 | Jackson, Jr. |
| 2013/0018796 A1* | 1/2013 | Kolhatkar ............ G06Q 20/405 705/44 |
| 2014/0143110 A1 | 5/2014 | Qin |
| 2015/0134512 A1 | 5/2015 | Mueller |
| 2015/0161622 A1 | 6/2015 | Hoffmann |
| 2015/0293994 A1 | 10/2015 | Kelly |
| 2015/0294028 A1 | 10/2015 | Bose |
| 2016/0171732 A1 | 6/2016 | Glover |
| 2016/0203488 A1* | 7/2016 | Guerrero ............... G06Q 50/26 705/44 |
| 2017/0053294 A1 | 2/2017 | Yang |
| 2017/0140382 A1 | 5/2017 | Chari |
| 2017/0169174 A1 | 6/2017 | Yeung |
| 2017/0178136 A1 | 6/2017 | Groarke |
| 2017/0178139 A1 | 6/2017 | Gieseke |
| 2018/0196694 A1 | 7/2018 | Banerjee |
| 2018/0197128 A1 | 7/2018 | Carstens |
| 2018/0330258 A1 | 11/2018 | Harris |
| 2019/0087821 A1* | 3/2019 | Jia ...................... G06Q 20/4016 |
| 2019/0132344 A1 | 5/2019 | Lem |
| 2019/0164173 A1 | 5/2019 | Liu |
| 2019/0266528 A1 | 8/2019 | Cheng |
| 2019/0286655 A1 | 9/2019 | Leskovec |
| 2019/0377819 A1 | 12/2019 | Filliben |
| 2019/0378050 A1 | 12/2019 | Edkin |
| 2020/0036821 A1 | 1/2020 | Liu |
| 2020/0081445 A1 | 3/2020 | Stetson |
| 2020/0090003 A1 | 3/2020 | Marques |
| 2020/0110761 A1 | 4/2020 | Cooper |
| 2020/0142957 A1 | 5/2020 | Patra |
| 2020/0160121 A1 | 5/2020 | Parasrampuria |
| 2020/0210833 A1 | 7/2020 | Xu |
| 2020/0226512 A1 | 7/2020 | Epstein |
| 2020/0320534 A1 | 10/2020 | Yerradoddi |
| 2020/0349586 A1 | 11/2020 | Deng |
| 2020/0364366 A1 | 11/2020 | Kundu |
| 2020/0380376 A1 | 12/2020 | Jain |
| 2021/0012346 A1 | 1/2021 | Walters |
| 2021/0014124 A1 | 1/2021 | Rossi |
| 2021/0019762 A1 | 1/2021 | Bosnjakovic |
| 2021/0027145 A1 | 1/2021 | Li |
| 2021/0049171 A1 | 2/2021 | Ziauddin |
| 2021/0049225 A1 | 2/2021 | Chang |
| 2021/0065245 A1 | 3/2021 | Resheff |
| 2021/0067549 A1 | 3/2021 | Chen |
| 2021/0158161 A1 | 5/2021 | Louizos |
| 2021/0176262 A1 | 6/2021 | Harris |
| 2021/0192376 A1* | 6/2021 | Sarferaz ................. G06F 40/40 |
| 2021/0209604 A1 | 7/2021 | Wang |
| 2021/0233080 A1 | 7/2021 | Shekhar |
| 2021/0303783 A1 | 9/2021 | Misra |
| 2021/0311952 A1 | 10/2021 | Jain |
| 2021/0334811 A1 | 10/2021 | Gu |
| 2021/0334822 A1 | 10/2021 | Pati |
| 2021/0334896 A1 | 10/2021 | Sarshogh |
| 2021/0374754 A1 | 12/2021 | Pandian |
| 2022/0020026 A1 | 1/2022 | Wadhwa |
| 2022/0101327 A1 | 3/2022 | Arora |
| 2022/0121891 A1 | 4/2022 | Au |
| 2022/0129871 A1 | 4/2022 | Rodgers |
| 2022/0138502 A1 | 5/2022 | Li |
| 2022/0172211 A1 | 6/2022 | Muthuswamy |
| 2022/0188837 A1 | 6/2022 | Assefa |
| 2022/0247662 A1 | 8/2022 | Chen |
| 2022/0300903 A1 | 9/2022 | Huang |
| 2022/0405860 A1* | 12/2022 | Juban .................... G06Q 40/00 |
| 2023/0013392 A1 | 1/2023 | Xu |
| 2023/0107703 A1* | 4/2023 | Zhang .................... G06N 20/00 705/39 |

OTHER PUBLICATIONS

Chen et al., Machine Learning Techniques for Anti-money Laundering (AML) Solutions in Suspicious Transaction Detection: A Review, Springer, Knowl Inf Syst, 2018.

Hu et al., "Characterizing and Detecting Money Laundering Activities on the Bitcoin Network", Dec. 27, 2019.

Jullum et al., Detecting Money Laundering Transactions with Machine Learning, Journal of Money Laundering Control, vol. 23, No. 1, pp. 173-186, 2020.

Ke et al., LightGBM: A Highly Efficient Gradient Boosting Decision Tree, 31st Conference on Neural Information Processing Systems (NIPS 2017), Long Beach, CA, USA.

Keyan et al., An Improved Support-Vector Network Model for Anti-Money Laundering, International Conference on Management of e-Commerce and e-Government, pp. 193-196, 2011.

Lannoo et al., Anti-Money Laundering in the EU: Time to Get Serious, CEPS-ECRI Task Force Report, 2021.

Larik et al., Clustering Based Anomalous Transaction Reporting, Procedia Computer Science 3, Science Direct, pp. 606-610, 2011.

Li et al., Intelligent Anti-Money Laundering Solution Based Upon Novel Community Detection in Massive Transaction Networks on Spark, 5th International Conference on Advanced Cloud and Big Data, pp. 176-181, 2017.

Liu et al., A Scan Statistics Based Suspicious Transaction Detection Model for Anti-Money Laundering (AML) in Financial Institutions, International Conference on Multimedia Communications, pp. 210-213, 2010.

Lorenz et al., Machine Learning Methods to Detect Money Laundering in the Bitcoin Blockchain in the Presence of Label Security, ICAIF, Oct. 15-16, 2020.

Oliveira et al., GuiltyWalker: Distance to Illicit Nodes in the Bitcoin Network, Association for Machine Learning, KDD, pp. 1-5, 2021.

Savage et al., Detection of Money Laundering Groups Using Supervised Learning in Networks, pp. 1-11, Elsevier, 2016.

Shokry et al., Counter Terrorism Finance by Detecting Money Laundering Hidden Networks Using Unsupervised Machine Learning Algorithm, International Conferences ICT, Society and Human Beings, pp. 89-97, 2020.

Tiwari et al., A Review of Money Laundering Literature: The State of Research in Key Areas, Pacific Accounting Review, vol. 32, No. 2, pp. 271-303, 2020.

Weber et al., "Anti-Money Laundering in Bitcoin: Experimenting with Graph Convolutional Networks for Financial Forensics", Jul. 2019.

Weber et al., Scalable Graph Learning for Anti-Money Laundering: A First Look, NeurIPS Workshop on Challenges and Workshops for AI in Financial Services, pp. 1-7, 2018.

Xingrong Luo, Suspicious Transaction Detection for Anti-Money Laundering, International Journal of Security and its Applications, vol. 8, No. 2, pp. 157-166, 2014.

Yang et al., DBSCAN Clustering Algorithm Applied to Identify Suspicious Financial Transactions, International Conference on Cyber-Enabled Distributed Computing and Knowledge Discovery, pp. 60-65, 2014.

Zhang et al., Machine Learning and Sampling Scheme: An Empirical Study of Money Laundering Detection, Computational Economics, pp. 1043-1063, 2019.

Alarab et al., "Comparative Analysis Using Supervised Learning Methods for Anti-Money Laundering in Bitcoin", 2020 Association for Computing Machinery, Jun. 19, 2020.

Bhagat et al., "Node Classification in Social Networks", Jan. 17, 2011.

Claudio Bellei, "The Elliptic Data Set: opening up machine learning on the blockchain", Aug. 6, 2019.

Grover et al., "node2vec: Scalable Feature Learning for Networks", Jul. 3, 2016.

(56) References Cited

OTHER PUBLICATIONS

Hagberg et al., "Exploring Network Structure, Dynamics, and Function Using Networkx", Proceedings/Talk SCIPY 2008, 2008.
Hassan et al., "Random-Walk Term Weighting for Improved Text Classification", 2006.
Lorenz et al., "Machine Learning methods to detect money laundering in the Bitcoin blockchain in the presence of label scarcity", Oct. 15, 2020.
Pedregosa et al., "Scikit-learn: Machine Learning in Python", Journal of Machine Learning Research, 2011.
Perozzi et al., "DeepWalk: Online Learning of Social Representations", 2014.
Satoshi Nakamoto, "Bitcoin: A Peer-to-Peer Electronic Cash System", 2008.
Petit et al., Random walks on dense graphs and graphons, arXiv preprint arXiv: 1909.11776v2, May 19, 2020, 22 pages.

\* cited by examiner

TRIAGING ALERTS USING MACHINE LEARNING

CROSS REFERENCE TO OTHER APPLICATIONS

This application claims priority to U.S. Provisional Patent Application No. 63/278,196 entitled ANTI-MONEY LAUNDERING ALERT OPTIMIZATION USING MACHINE LEARNING WITH GRAPHS filed Nov. 11, 2021, which is incorporated herein by reference for all purposes.

BACKGROUND OF THE INVENTION

Rule-based systems are typically used to analyze data by applying one or more rules to the data and outputting alerts if the data meets criteria set forth by the rules. For example, an anti-money laundering system may include rules defined by human experts. The rules are used to interpret transactional data to predict whether transactions are part of a money-laundering scheme. An alert is generated for those transactions that are potentially part of a money-laundering scheme. A security analyst may then review the alert to determine how to respond. However, there may be a large number of alerts or a high false positive rate, making the review of the alerts tedious or inefficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for triaging alerts using machine learning are disclosed. In various embodiments, a triage machine learning model is configured and trained to score alerts reflecting an importance of a case (e.g., likelihood of being suspicious). An "alert" or an "alerted transaction" refers to transactions alerted by rules as further described herein. The triage model facilitates and optimizes alert review because it allows the usage of resources for alert review to be improved. An alert manager then determines an action to take with respect to the alert such as ranking alerts, forwarding the alert for analyst review, assigning the alert to an appropriate queue, or the like. For example, alerts can be ranked based on their scores. Cases that are likely to be true positives (e.g., as defined by a score threshold) are prioritized by assigning them to a first queue and cases that are less likely to be true positives are assigned to a second queue. The first queue gets reviewed immediately by senior analysts, while the second queue is reviewed by a less senior team. If an analyst considers a case in the second queue to be suspicious, then the case can be escalated to the first queue. In various embodiments, explanations for the triage model's decisions can be determined and output to aid analysts in their investigation and review of alerts. In various embodiments, the triage model can be monitored, adapted, and re-trained, e.g., in response to model performance change or rule set changes. For example, a new rule bypasses triage prior to having sufficient labels to re-train the model.

In various embodiments, a process for triaging alerts includes receiving data associated with transactions and using one or more computer processors to analyze the received data using one or more rules to automatically identify potentially suspicious activities. Based at least in part on analysis results of the one or more rules associated with the identified potentially suspicious activities, the process uses a machine learning model to at least in part automatically triage the identified potentially suspicious activities to automatically process at least a portion of the identified potentially suspicious activities.

In various embodiments, a process for training a machine learning model to triage alerts includes configuring a machine learning model and receiving training data (e.g., alerted transactions). The process uses one or more computer processors and the received training data to train the machine learning model to triage potentially suspicious activities including by automatically processing at least a portion of the potentially suspicious activities, where the potentially suspicious activities are identified by one or more rules in a set of rules.

Figure 1:
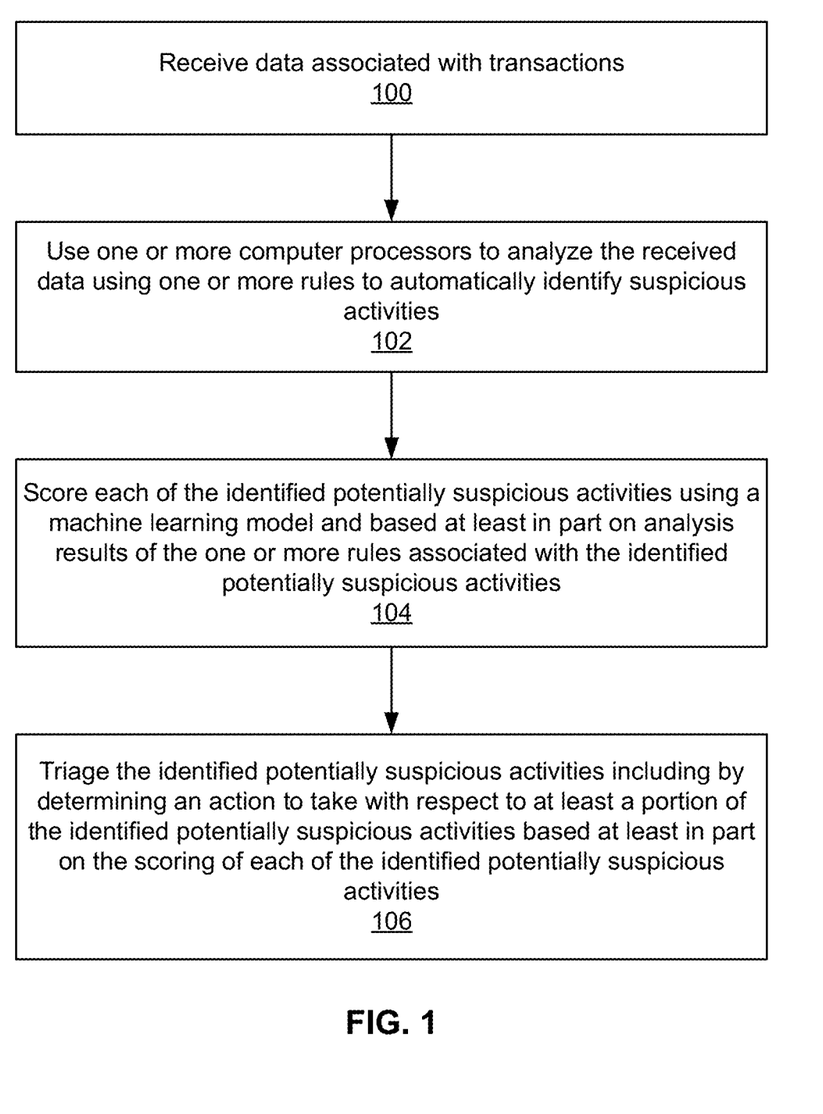
FIG. 1 is a flow diagram illustrating an embodiment of a process for triaging alerts using machine learning.

FIG. 1 is a flow diagram illustrating an embodiment of a process for triaging alerts using machine learning. This process may be implemented on or by the system shown in FIG. 4.

In the example shown, the process begins by receiving data associated with transactions (100). The data can be enriched to extract features. The process can extract the features associated with the received data, or the features can be provided to the process along with the data. For example, the process extracts a first set of features to be used to analyze the received data using the one or more rules to automatically identify potentially suspicious activities. The process extracts a second set of features to be used to score each of the identified potentially suspicious activities using the machine learning model. In other words, some features may be used by one or more rules to identify suspicious activities and some features may be used by a machine learning model to triage the identified suspicious activities. The features used by the rule(s) and the features used by the model may be the same, different, or overlap.

The process uses one or more computer processors to analyze the received data using one or more rules to automatically identify potentially suspicious activities (102). The processor(s) may analyze the received data by applying one or more rules to the data. The rules may generate an alert or otherwise flag those entities (e.g., customer, account) or transactions that are associated with potentially suspicious activities.

For example, in an anti-money laundering system, relevant features used by the rule(s) include, but are not limited to:

Characteristics of an account/customer such as profession or age

Figure 5:
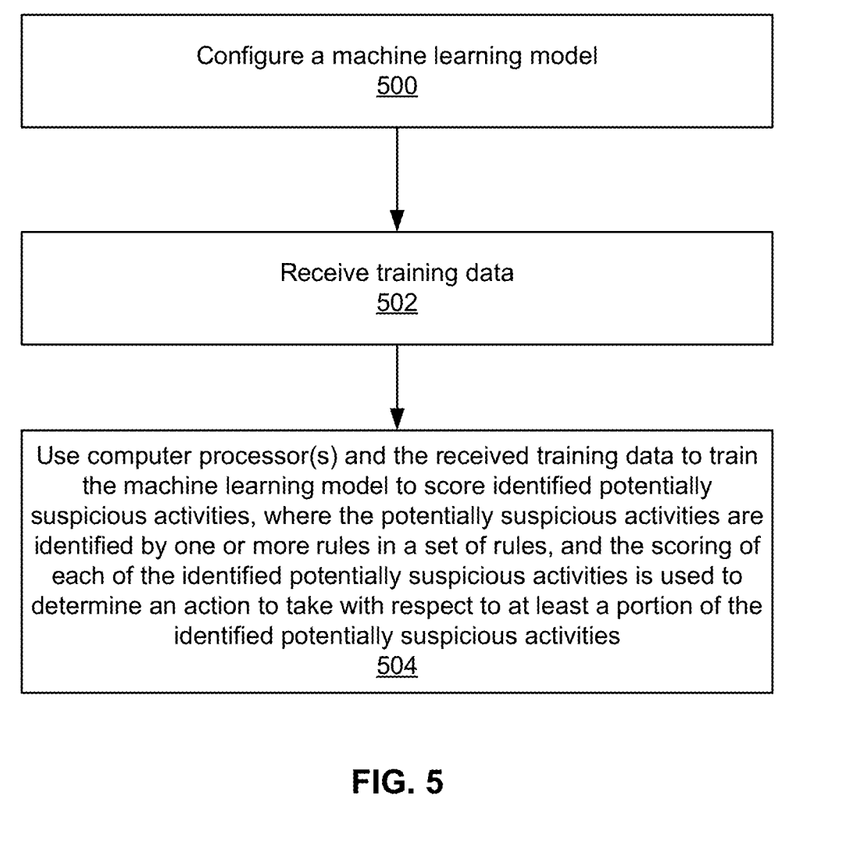
FIG. 5 is a flow diagram illustrating an embodiment of a process for training a machine learning model to triage alerts.

Typical behavior of the customer including typical movements of money such as the average amount spent in the last week or the number of transfers on the last day The process scores each of the identified potentially suspicious activities using a machine learning model based at least in part on analysis results of the one or more rules associated with the identified potentially suspicious activities (104). The machine learning model is trained to assign a score to an identified potentially suspicious activity using the analysis result. For example, in an anti-money laundering system, relevant features used by the model include, but are not limited to:

Relationships of the customer and others the customer interacts with such as the number of unique counterparties or distance to suspicious customers Communities such as how much money is moving within a community, community size, closeness centrality, or betweenness centrality An example of how to train the model is shown in FIG. 5. An analysis result includes information associated with the alert such as the features described herein, which rules were triggered, and related transactions contributing to the same alerts. For example, a score indicates the likelihood of an activity being a true positive.

The process triages the identified potentially suspicious activities including by determining an action to take with respect to at least a portion of the identified potentially suspicious activities based at least in part on the scoring of each of the identified potentially suspicious activities (106). The score determined by the model can be used to determine an action to take (e.g., resolve) with respect to a potentially suspicious activity (also sometimes referred to as an alert) based on user rules or guidelines. The score can be used to determine actions to take such as:

rank alerts by score,
group alerts into various importance levels,
de-prioritize low importance alerts,
prioritize high importance alerts,
send alerts to teams or analysts for review,
hibernate alerts (which snoozes alerts and closes alerts after a specified time such as 60 days), or
create different queues (e.g., group by risk) to be addressed by different teams or analysts.

A user can define how to manage the priority of an alert. A priority of an alert can be changed by decreasing a priority (de-prioritizing) or increasing a priority (prioritizing) of the alert. An alert can be de-prioritized by removing the activity from the list or decreasing its rank or priority in the list. An alert can be prioritized by increasing its rank or priority in the list. Whether to de-prioritize or prioritize an alert can be based on a corresponding score. For example, alerts below some score threshold are de-prioritized and/or alerts above some score threshold are prioritized. As another example, alerts can be prioritized by only providing (e.g., storing or outputting) the top n activities, where n can be a pre-defined number such as the top 10 activities selected based on review capabilities available. The other activities are suppressed.

The actions described above are merely exemplary and not intended to be limiting. An action to take with respect to an identified potentially suspicious activity can be tailored to a use case and/or defined by a user depending on operations, risk appetite, applicable regulations, among other things.

Figure 2:
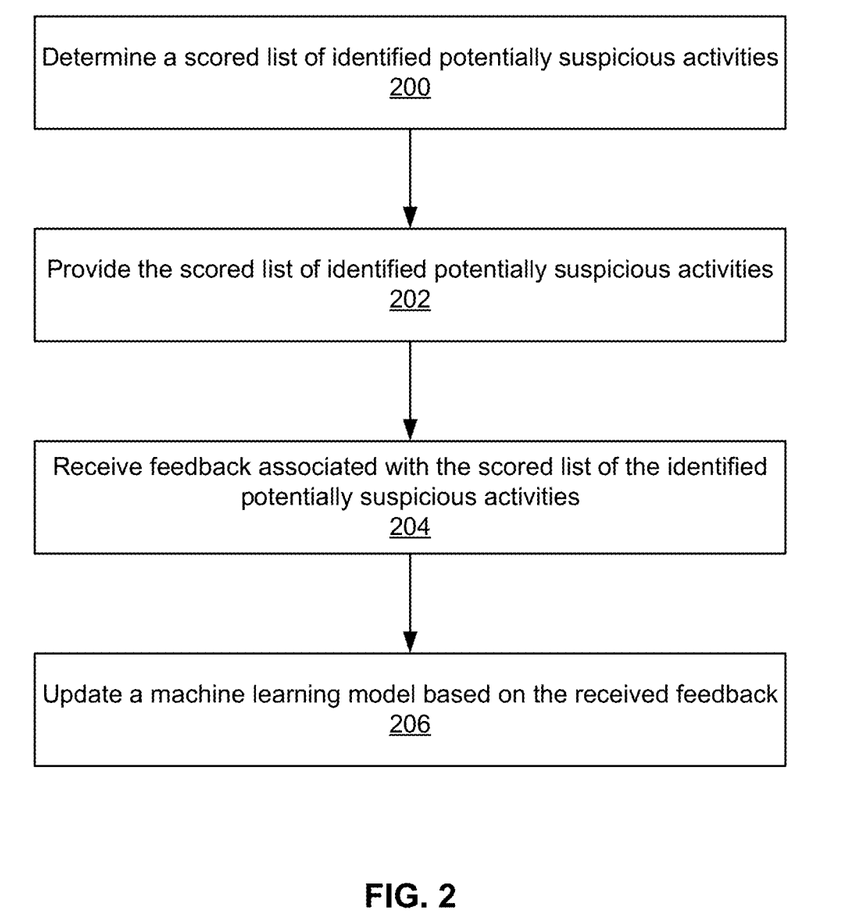
FIG. 2 is a flow diagram illustrating an embodiment of a process for triaging alerts using machine learning and feedback.

FIG. 2 is a flow diagram illustrating an embodiment of a process for triaging alerts using machine learning and feedback. This process may be implemented on or by the system shown in FIG. 4. This process may be implemented as part of another process such as after 104 of FIG. 1.

In the example shown, the process begins by determining a scored list of identified potentially suspicious activities (200). The list can be assembled by collecting identified potentially suspicious activities and querying a machine learning model to determine their scores.

The process provides the scored list of the identified potentially suspicious activities (202). For example, the process stores the list or outputs the list. The list can be obtained by a decision module such as an alert manager that determines an action to take with respect to an activity such as ranking the activities so they can be presented according to their risk as further described herein.

The process receives feedback associated with the scored list of the identified potentially suspicious activities (204). The feedback can be automatic feedback or feedback from a human. Examples of feedback include labels or other information such as a chargeback, whether an entity associated with a transaction is on a watchlist, the result of expert human review, etc.

The process updates the machine learning model based on the received feedback (206). For example, the machine learning model can be re-trained using the updated labels from the feedback.

Figure 3:
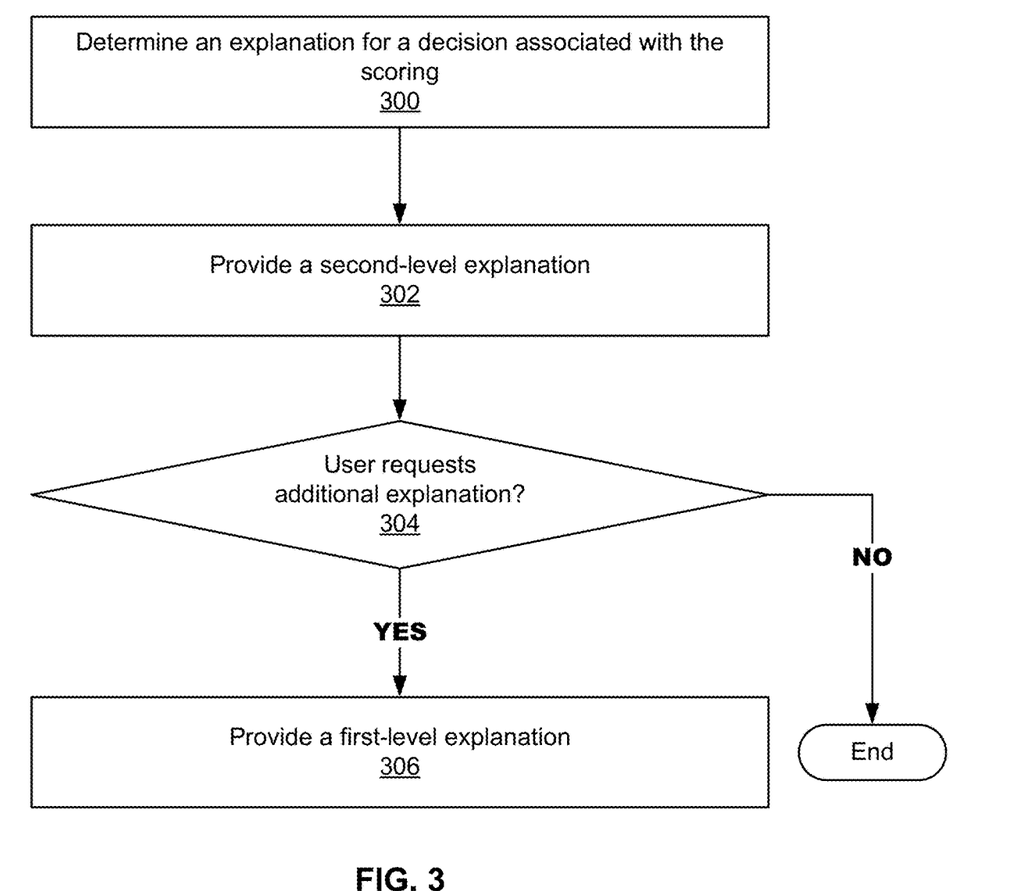
FIG. 3 is a flow diagram illustrating an embodiment of a process for alert optimization including determining explanations for alert processing.

FIG. 3 is a flow diagram illustrating an embodiment of a process for alert optimization including determining explanations for alert processing. This process may be implemented on or by the system shown in FIG. 4. This process may be implemented as part of another process such as after 104 of FIG. 1.

In the example shown, the process begins by determining an explanation for a decision associated with the scoring (300). The explanations used by the disclosed triage model can be used to provide insights into the scores. Human reviewers, regulators, and others may find this helpful. For example, explanations include what features contributed most to a model decision, which reviewers may find helpful. This can greatly decrease reviewer investigation time. As another example, if the triage model is used for alert suppression (e.g., low priority alerts are suppressed without human review), these explanations can be used to justify the decision to the regulators.

The process may then provide an explanation by performing 302 to 306. For example, providing the explanation includes initially providing a second-level explanation that includes a grouping of features that belong to a same concept or semantic group, followed by providing a first-level explanation as follows. In various embodiments, a multi-level explanation strategy is used to provide white-box explanations of predicted scores. A first level explanation (e.g., 810 of FIG. 8B) is more detailed and shows the specific features used by the model and their contributions to the model's decision. One way to determine the specific features is by using a TreeSHAP algorithm. This information could have some redundancy for a human reviewer since models typically use many features and some of the features could be capturing information about the same semantic meaning or concept. Thus, a second-level explanation can be presented.

The process provides a second-level explanation (302). A second level of explanation (e.g., 800 of FIG. 8A) can be presented to provide an aggregated view of the features by grouping the ones that belong to the same concept/semantic group together based on human expert knowledge. As described with respect to FIG. 3, in various embodiments, second level explanations are presented first.

If the user requests additional explanation (304), the process provides a first-level explanation. In various embodiments, the first-level explanation includes features and associated contributions used by the machine learning model to determine the decision associated with the automatic triaging. Otherwise, if the user does not request additional explanation, the process ends.

Figure 4:
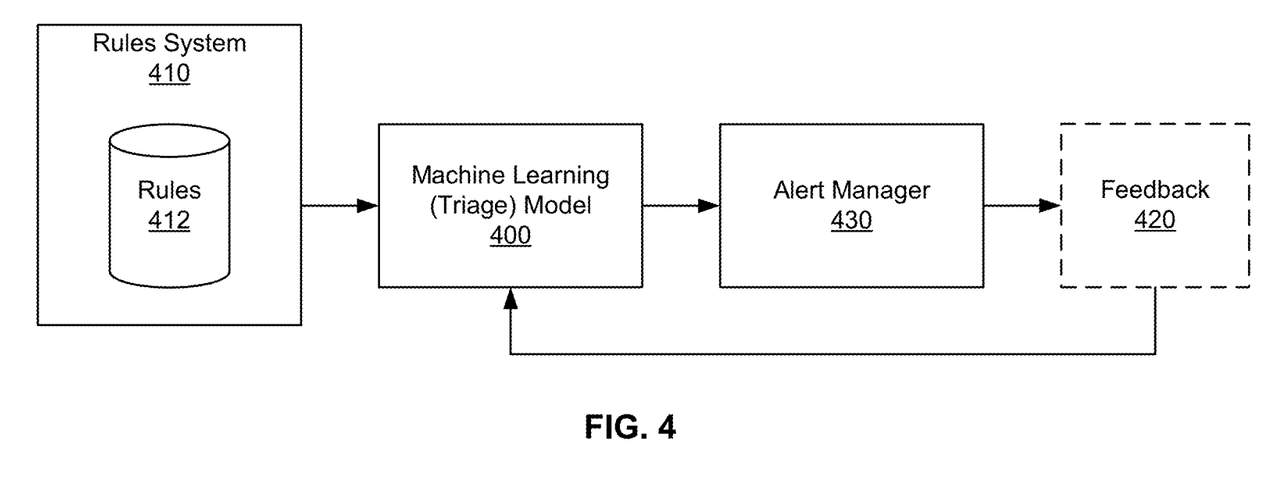
FIG. 4 is a block diagram illustrating an embodiment of a system for alert optimization using machine learning to triage alerts.

FIG. 4 is a block diagram illustrating an embodiment of a system for alert optimization using machine learning to triage alerts. The system includes a rules system 410, machine learning (triage) model 400, and an alert manager 430. Rules system 410 is configured to apply one or more rules from rules store 412 to generate one or more alerts. Machine learning (triage) model 400 is configured to score the alerts. Model 400 can be trained using the process of FIG. 5. Alert Manager 430 is configured to process the alerts based on the scores determined by the model, for example outputting some of the alerts for user review. Feedback (e.g., user review) 420 is optionally received and used to improve model 400 (e.g., by applying the process of FIG. 2) and/or rules sets in rules store 410.

In operation, the system of 400 is configured to perform the process of FIG. 1. Rules system 410 processes a transaction by applying rules 412. Alerts output by the rules system are triaged by the machine learning (triage model) using a score assigned to the alert by the model. The alert manager 430 then processes the alerts output by the model. Optionally, feedback such as user review 420 is used to improve the model 400.

FIG. 5 is a flow diagram illustrating an embodiment of a process for training a machine learning model to triage alerts. This process may be implemented on or by the system shown in FIG. 4.

In the example shown, the process begins by configuring a machine learning model (500). The model can be configured with initial settings such as parameters for how long to train the model, what learning rate to use or how strong regularization should be. If the model is being re-trained because the volume of alerts has changed, it can be configured with updated information such as new labels, as further described herein.

The process receives training data (502). In various embodiments, the training data includes potentially suspicious activities (alerts), which may be identified by applying rules to transactional data. The process may enrich the data to obtain various features. One type of feature is called an entity (or profile) feature. Another type of feature is called a neighborhood feature and may be subject to graph analysis (e.g., relationships of customers and communities).

Using the example of anti-money laundering, a set of entity/profile features engineered for the triage model characterizes the history of transactions specific to each account. A profile is an arithmetic aggregation by a particular field and over a specified time window, such as the total amount spent per account in the past week.

These features enable a machine learning model to contrast historical (long windows) with current behavior (short windows) and correlate that with suspicious activity. Example time windows include one day, one and two weeks, one and two months. In various embodiments, the aggregation functions include sum, mean, minimum, maximum, and count as well as those that may cover several time windows such as ratios and differences. Any feature selection (including permutation-based feature selection) can be performed over the profiles by training a gradient boosted trees model on a sample of the training dataset, keeping the smallest set of features which cumulatively contribute up to a predefined percentage (e.g., 90%) of the performance for the metric of interest. As a result, a subset of the profiles is selected to enrich the data. Profiles can be built by automatically generating features based on the semantic labels of the data fields (e.g., entity, location, date, or amount).

While profile features capture entity-centric behavior, graph features capture inter-entity relations. Because money flows occur between bank accounts, one choice is to represent accounts as nodes and transactions as edges between accounts. The direction of the edge follows the direction of the money (from sender to receiver), and edge attributes include the transaction timestamp and amount.

Scalability can be an issue when many events (e.g., on the order of millions) need to be processed per second. Since older events become progressively less relevant, a dynamic graph construction leveraging sliding windows to limit the number of events needed at any moment in time can be used. Similar to profile features, the graph-based features are computed periodically (e.g., every day) as follows. First, the graph snapshot of the previous day is updated by removing the edges that no longer fall within the sliding window and by adding new edges corresponding to the current day's events. Secondly, the graph features for every node with an event in the target day (accounts requiring evaluation) are calculated.

Some examples of specific graph features used by the triage model for anti-money laundering will be discussed but this is not intended to be limiting as the process can be applied to other graph-based features using the same or similar transactional graph. Suspicious accounts are expected to have more counterparties on average. To convey this information to the model, the in- and out-degrees of the target node are calculated. Additionally, in- and out-degrees of its successors and predecessors' mean, minimum, and maximum are calculated. In this way, eight new features are created that characterize the number of counterparties of an account and its neighborhood. Analogously, a weighted version of these features is calculated by using the transferred amount as the edge weight. Because the above features contain information from nodes that are one hop away from the target node, they cannot be captured by the profile features.

Money laundering patterns typically involve criminal networks. Therefore, suspicious nodes tend to have a higher probability of being connected to other suspicious nodes. This property is captured by Guilty-Walker (GW) features where random walks are generated which stop upon reaching a known illicit node or if there are no available connections. A predefined number of random walks (e.g., 50) can be run for each target node. Features characterizing the length of the random walks (e.g., minimum, maximum, median, mean, standard deviation, 25th, and 75th percentile), the fraction of successful random walks (the "hit rate"), and the number of distinct illicit nodes encountered can be computed.

In anti-money laundering, feedback is typically not immediate because investigations tend to be lengthy. Because labels are typically not immediately available for all past transactions, a waiting period can be introduced as follows. A machine learning model is trained using profiles and degree features and other features that do not necessarily depend on the label on a first training set. The resulting model is used to score a second training set and define a suitable threshold to obtain pseudo-labels. The Guilty-Walker features are computed using the pseudo-labels for the unlabeled transactions in the waiting period and the actual labels otherwise. Finally, the triage model is trained on the second training set, using profiles, degrees, and GuiltyWalker features.

The process uses one or more computer processors and the received training data to train the machine learning model to score potentially suspicious activities including by automatically processing at least a portion of the potentially suspicious activities, wherein the potentially suspicious activities are identified by one or more rules in a set of rules (504).

Figure 6:
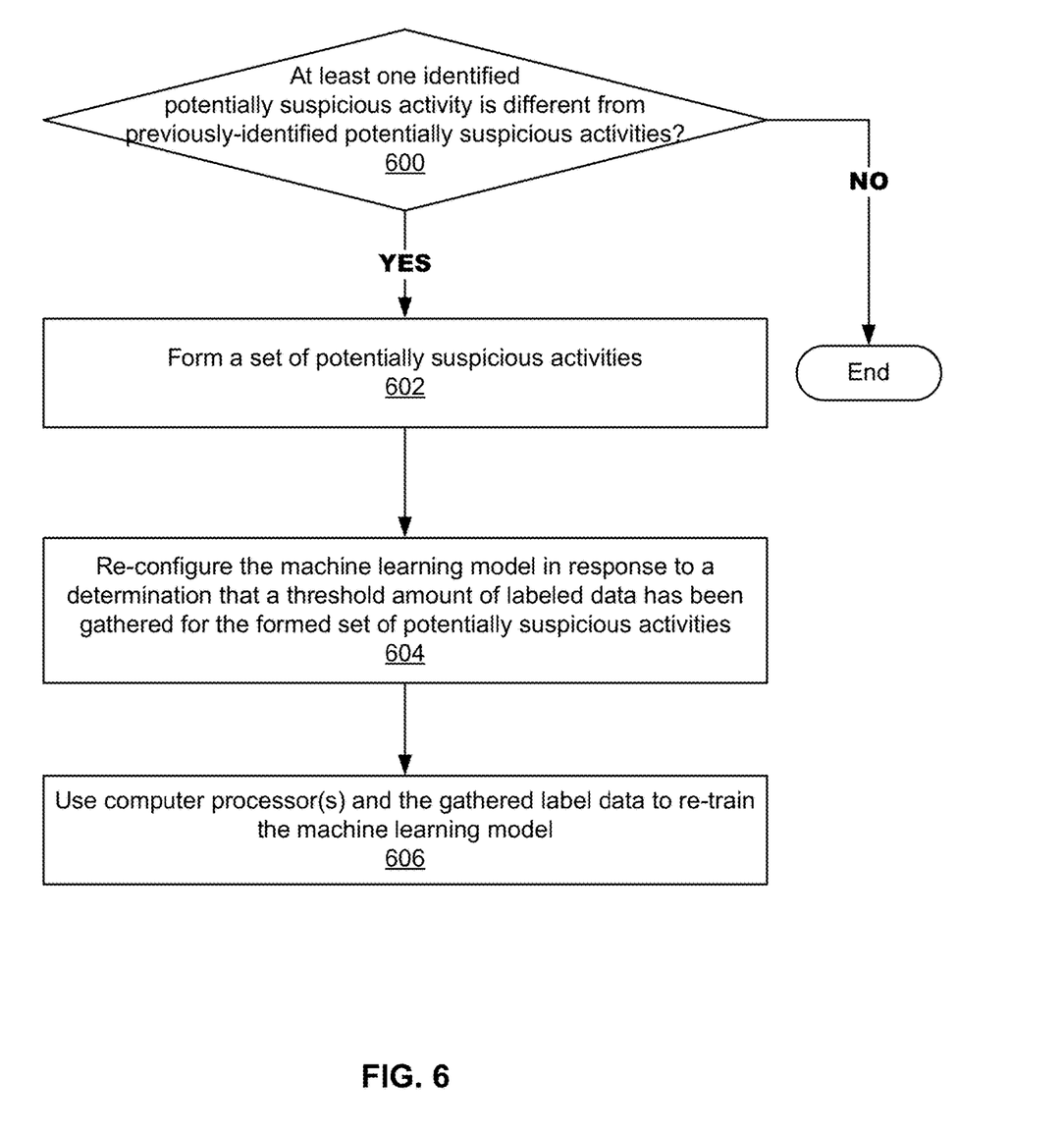
FIG. 6 is a flow diagram illustrating an embodiment of a process for re-training a machine learning model to triage alerts.

FIG. 6 is a flow diagram illustrating an embodiment of a process for re-training a machine learning model to triage alerts. This process may be implemented on or by the system shown in FIG. 4. This process may be implemented as part of another process such as after 504 of FIG. 5.

In the example shown, the process begins by determining whether at least one identified potentially suspicious activity is different from previously-identified potentially suspicious activities (600). In other words, the process determines whether the potentially suspicious activities are expected to be a subset of the original potentially suspicious activities. The set of alerts may change when the scope of a rule set changes such as by changing a threshold of one or more rules or adding one or more rules to the rule set. When the scope of a rule is expanded, the model can be re-trained so that the new alerts are appropriately triaged and processed. In various embodiments, when a new rule is added to the rule set, some of the alerts may overlap with alerts generated by other rules. Overlapping alerts are considered for prioritization (scored by the machine learning model), while the non-overlapping alerts are not scored by the model until after the model is re-trained.

If at least one identified potentially suspicious activity is not different from previously-identified potentially suspicious activities (e.g., the scope of the alerts remains unchanged), the process ends. For example, if a rule has been removed or a rule set is unchanged, the machine learning model does not need to be changed.

Otherwise, if at least one identified potentially suspicious activity is different from previously-identified potentially suspicious activities, the process proceeds to 602 to form a set of potentially suspicious activities. This set of alerts is expected to differ from an earlier set of alerts because the scope of alerts increases due to adding a rule or changing a threshold. More specifically, the pool of alerts is expected to grow and include some types of alerts that the model has not previously seen.

The process re-configures the machine learning model in response to a determination that a threshold amount of labeled data has been gathered for the formed set of potentially suspicious activities (604). The threshold amount of labeled data can be set so that the model is re-trained at an optimal time (not too frequently or infrequently).

The process uses computer processor(s) and the gathered labeled data to re-train the machine learning model (606). After the model is re-trained, it will be able to (more accurately) score those new alerts that were generated due to the rule, threshold, or other change that caused the number of alerts to increase (or at least remain unchanged).

In various embodiments, alerts generated by rule set changes (e.g., a new rule) are handled as follows. The process runs the rule on historical data, and all or a sample of the alerts are reviewed by analysts. The sample can be selected at random, selected following active learning policies, etc. The machine learning model is re-trained using the new labels, and then the model is deployed for the entirety of the rule set.

Figure 7:
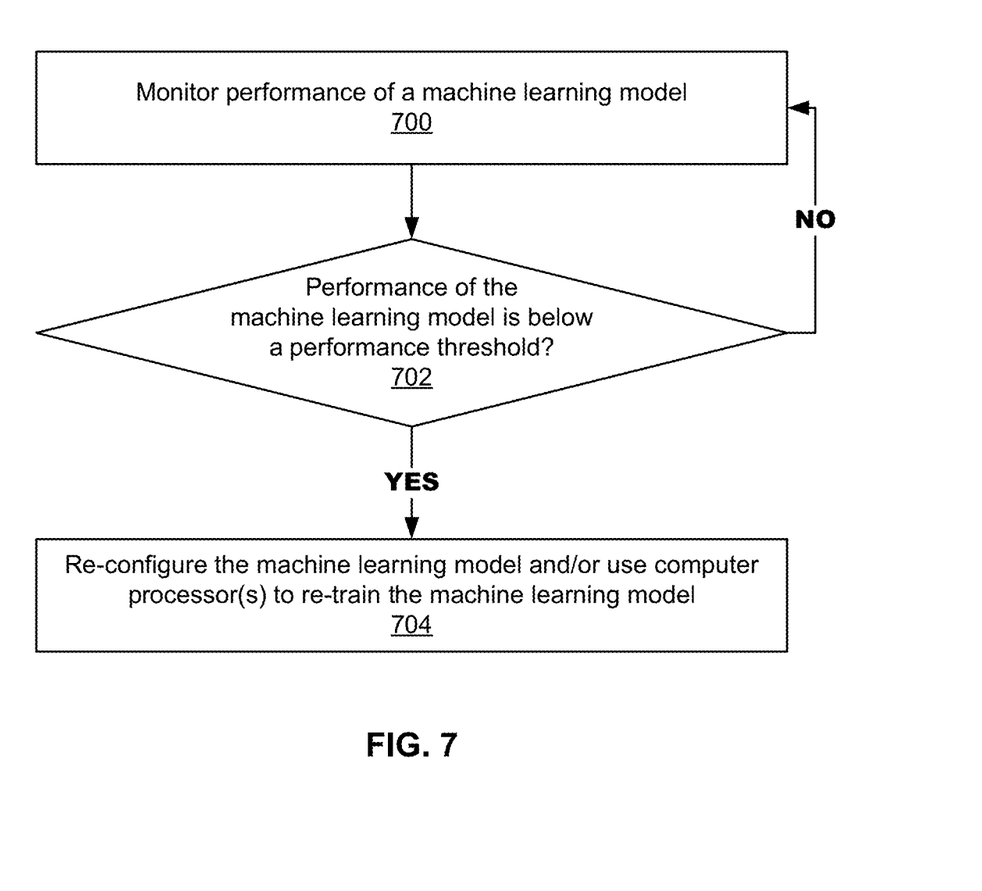
FIG. 7 is a flow diagram illustrating an embodiment of a process for monitoring performance of a machine learning model that triages alerts.

FIG. 7 is a flow diagram illustrating an embodiment of a process for monitoring performance of a machine learning model that triages alerts. This process may be implemented on or by the system shown in FIG. 4. This process may be implemented as part of another process such as after 504 of FIG. 5.

In the example shown, the process begins by monitoring performance of the machine learning model (700). In various embodiments, the performance of the machine learning model is monitored continuously. The model can be monitored by comparing model predictions with actual results (e.g., true labels) provided by human reviewers (e.g., 420). Although some alerts may be assigned to a lower priority queue because they score below a score threshold, they can nevertheless be evaluated earlier as follows. In various embodiments, monitoring the performance of the machine learning model includes determining a label (e.g., by a human reviewer) of at least one of the potentially suspicious activities that is assigned a score below a priority threshold by the trained machine learning model. Those low-scoring potentially suspicious activities (assigned a score below the priority threshold) for which labels are determined can be randomly selected. The number of such low-scoring alerts to review can be user-defined such as a pre-defined percentage of low-scoring alerts.

The process determines whether performance of the machine learning model is below a performance threshold (702). For example, the threshold is based on a percentage of positives in a group of low-scoring potentially suspicious activities.

If the performance of the machine learning model is not below a performance threshold, the process continues monitoring performance of the model (700).

Otherwise, if the performance of the machine learning model is below a performance threshold, the process proceeds to re-configure the machine learning model and/or use computer processor(s) to re-train the machine learning model (704). The model can be re-configured by selecting a new model threshold such as lowering the model score threshold below which an alert is suppressed. In various embodiments, an explanation (examples of which are described with respect to FIG. 3) generated by the machine learning model can be used to re-configure the machine learning model and/or re-train the machine learning model.

Figure 8A:
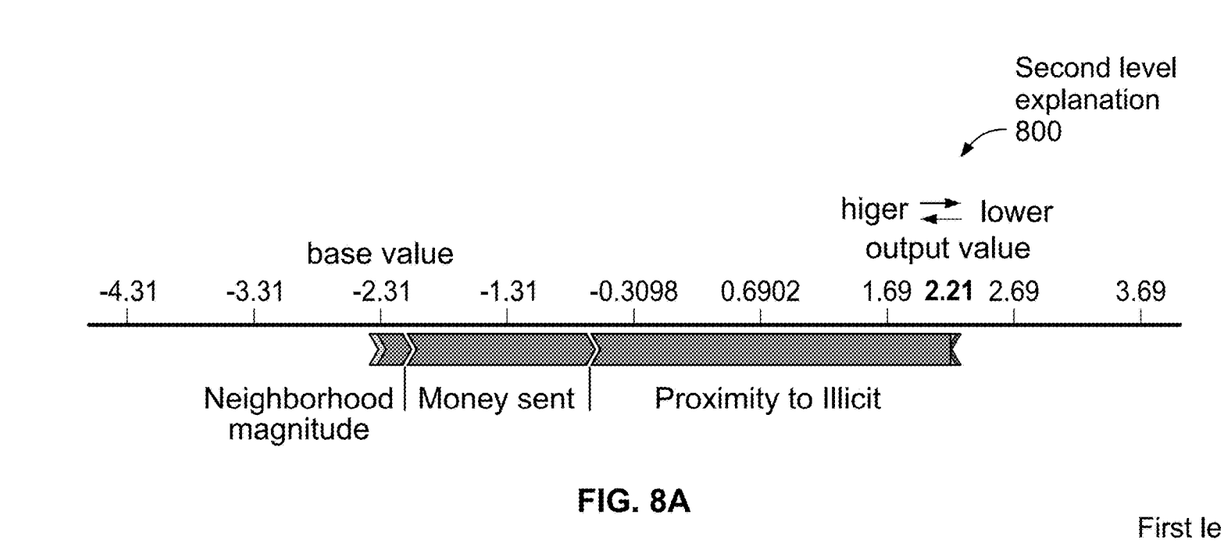
FIG. 8A is a diagram illustrating an example of a graphical user interface for showing an explanation of alert triaging by a machine learning model.

FIG. 8A is a diagram illustrating an example of a graphical user interface for showing an explanation of alert triaging by a machine learning model. As described with respect to FIG. 3, the explanations used by the disclosed triage model can be used to provide insights into the scores.

In this example, a second level explanation 800 is shown. Explanation 800 provides an aggregated view of the features by grouping the ones that belong to the same concept/semantic group together based on human expert knowledge. The specific features are neighborhood magnitude, money sent, and proximity to illicit are shown along with their corresponding contribution to the score (2.21). A reviewer can quickly tell at a glance that the feature "proximity to illicit" had the greatest contribution to the score.

Figure 8B:
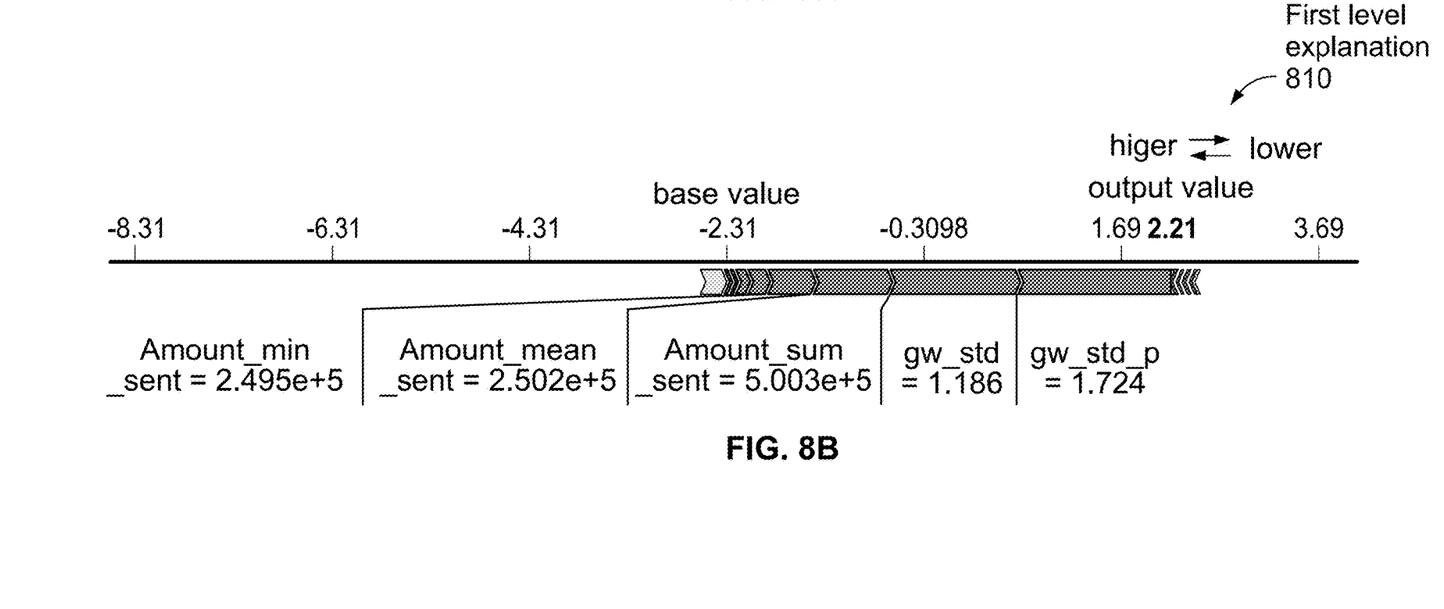
FIG. 8B is a diagram illustrating an example of a graphical user interface for alert optimization using machine learning to triage alerts.

FIG. 8B is a diagram illustrating an example of a graphical user interface for alert optimization using machine learning to triage alerts. In this example, a first level explanation 810 is shown. This explanation is more detailed. For example, the features amount_min_sent, amount_mean_sent, and amount_sum_sent can be grouped into "money sent" in FIG. 8A but are shown separately to provide more detail. As described with respect to FIG. 3, in various embodiments, second level explanations are presented first, and if a user wants to see more details they can be presented as shown in the figure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving data associated with transactions;
   using one or more computer processors to analyze the received data using one or more rules to automatically identify potentially suspicious activities;
   configuring a machine learning model;
   receiving training data;
   enriching the training data including by:
   obtaining a graph snapshot of a prior time period;
   updating the graph snapshot including by removing edges of a graph data representation of the transactions that no longer fall within at least one sliding window and adding at least one new edge corresponding to a current time period;
   determining a graph feature for every node with an event in a target day for at least a portion of the received data; and
   determining a node property feature including by:
   performing a random walk that ends in response to at least one of:
   reaching a known illicit node or an absence of available connections; and
   calculating a metric associated with a comparison of successful random walks with respect to a total number of random walks, wherein a successful random walk ends in reaching the known illicit node;
   using the one or more computer processors and the enriched training data to train the machine learning model to evaluate potentially suspicious activities;
   scoring each of the identified potentially suspicious activities based at least in part on an output of the trained machine learning model and analysis results of the one or more rules associated with the identified potentially suspicious activities; and
   triaging the identified potentially suspicious activities including by determining an action to take with respect to at least a portion of the identified potentially suspicious activities based at least in part on the scoring of each of the identified potentially suspicious activities.

2. The method of claim 1, further comprising extracting a first set of features and a second set of features associated with the received data, wherein:
   the first set of features is used to analyze the received data using the one or more rules to automatically identify potentially suspicious activities, and
   the second set of features is used to score each of the identified potentially suspicious activities using the machine learning model.

3. The method of claim 1, wherein triaging the identified potentially suspicious activities includes changing a priority of at least one of the identified potentially suspicious activities.

4. The method of claim 1, further comprising:
   determining a scored list of the identified potentially suspicious activities; and
   providing the scored list of the identified potentially suspicious activities.

5. The method of claim 4, further comprising:
   receiving feedback associated with the scored list of the identified potentially suspicious activities; and
   updating the machine learning model based on the received feedback.

6. The method of claim 1, further comprising:
   determining an explanation for a decision associated with the triaging; and
   providing the explanation.

7. The method of claim 6, wherein providing the explanation includes initially providing a second-level explanation that includes a grouping of features that belong to a same concept or semantic group.

8. The method of claim 7, wherein:
   providing the explanation further includes providing a first-level explanation after providing the second-level explanation; and
   the first-level explanation includes features and associated contributions used by the machine learning model to determine the decision associated with the automatic triaging.

9. A system, comprising:
a processor configured to:
- receive data associated with transactions;
- use one or more computer processors to analyze the received data using one or more rules to automatically identify potentially suspicious activities;
- configure a machine learning model;
- receive training data;
- enrich the training data including by:
  - obtaining a graph snapshot of a prior time period;
  - updating the graph snapshot including by removing edges of a graph data representation of the transactions that no longer fall within at least one sliding window and adding at least one new edge corresponding to a current time period;
- determine a graph feature for every node with an event in a target day for at least a portion of the received data; and
- determine a node property feature including by:
  - performing a random walk that ends in response to at least one of:
- reaching a known illicit node or an absence of available connections; and
  - calculating a metric associated with a comparison of successful random walks with respect to a total number of random walks, wherein a successful random walk ends in reaching the known illicit node;
- train, using the enriched training data, the machine learning model to evaluate potentially suspicious activities;
- score each of the identified potentially suspicious activities based at least in part on an output of the trained machine learning model and analysis results of the one or more rules associated with the identified potentially suspicious activities; and
- triage the identified potentially suspicious activities including by determining an action to take with respect to at least a portion of the identified potentially suspicious activities based at least in part on the scoring of each of the identified potentially suspicious activities; and
a memory coupled to the processor and configured to provide the processor with instructions.

10. The system of claim 9, wherein the processor is further configured to extract a first set of features and a second set of features associated with the received data, wherein:
- the first set of features is used to analyze the received data using the one or more rules to automatically identify potentially suspicious activities, and
- the second set of features is used to score each of the identified potentially suspicious activities using the machine learning model.

11. A non-transitory computer readable medium storing computer instructions, when executed by a processor, causes the processor to:
- receive data associated with transactions;
- use one or more computer processors to analyze the received data using one or more rules to automatically identify potentially suspicious activities;
- configure a machine learning model;
- receive training data;
- enrich the training data including by:
  - obtaining a graph snapshot of a prior time period;
  - updating the graph snapshot including by removing edges of a graph data representation that no longer fall within at least one sliding window and adding at least one new edge corresponding to a current time period;
- determine a graph feature for every node with an event in a target day for at least a portion of the received data; and
- determine a node property feature including by:
  - performing a random walk that ends in response to at least one of: reaching a known illicit node or an absence of available connections; and
  - calculating a metric associated with a comparison of successful random walks with respect to a total number of random walks, wherein a successful random walk ends in reaching the known illicit node;
- train, using the enriched training data, the machine learning model to evaluate potentially suspicious activities;
- score each of the identified potentially suspicious activities based at least in part on an output of the trained machine learning model and analysis results of the one or more rules associated with the identified potentially suspicious activities; and
- triage the identified potentially suspicious activities including by determining an action to take with respect to at least a portion of the identified potentially suspicious activities based at least in part on the scoring of each of the identified potentially suspicious activities.

12. The method of claim 1, further comprising:
- determining that at least one identified potentially suspicious activity is different from a previously-identified potentially suspicious activity;
- form a set of potentially suspicious activities;
- re-configure the machine learning model in response to a determination that a threshold amount of labeled data has been gathered for the formed set of potentially suspicious activities; and
- in response to re-configuring the machine learning model, retraining the machine learning model to more accurately analyze potentially suspicious activities compared with a machine learning model that has not been re-trained.

* * * * *